(12) United States Patent
van Houtum (10) Patent No.: US 12,119,856 B2
(45) Date of Patent: Oct. 15, 2024

(54) WIRELESS RECEIVER UNIT, SPATIAL PHASE CORRECTOR CIRCUIT FOR AMPLITUDE MODULATION AND METHOD THEREFOR

(71) Applicant: NXP B.V., Eindhoven (NL)

(72) Inventor: Wilhelmus Johannes van Houtum, Sint-oedenrode (NL)

(73) Assignee: NXP B.V., Eindhoven (NL)

( * ) Notice: Subject to any disclaimer, the term of this patent is extended or adjusted under 35 U.S.C. 154(b) by 368 days.

(21) Appl. No.: 17/719,639

(22) Filed: Apr. 13, 2022

(65) Prior Publication Data

US 2022/0376727 A1 Nov. 24, 2022

(30) Foreign Application Priority Data

Apr. 29, 2021 (EP) .................................... 21171341

(51) Int. Cl.
*H04B 1/18* (2006.01)
*H04B 7/0456* (2017.01)
*H04B 7/08* (2006.01)

(52) U.S. Cl.
CPC ............. *H04B 1/18* (2013.01); *H04B 7/0456* (2013.01); *H04B 7/0845* (2013.01)

(58) Field of Classification Search
CPC .......... H04B 1/18; H04B 7/08; H04B 7/0845; H04B 7/0456
See application file for complete search history.

(56) References Cited

U.S. PATENT DOCUMENTS

| | | | | | |
|---|---|---|---|---|---|
| 5,982,327 | A | * | 11/1999 | Vook | H04B 7/0851 342/383 |
| 6,018,317 | A | * | 1/2000 | Dogan | H04B 7/0857 342/373 |

(Continued)

FOREIGN PATENT DOCUMENTS

| | | | | |
|---|---|---|---|---|
| EP | 1983657 A1 | * | 10/2008 | ......... H03H 21/0012 |
| EP | 2547004 A2 | * | 1/2013 | ........... H04B 7/0634 |
| WO | WO-2004062136 A1 | * | 7/2004 | ........... H04B 7/0857 |

OTHER PUBLICATIONS

Han, J.H., "Novel Feed Network for Circular Polarization Antenna Diversity", IEEE Antennas and Wireless Propagation Letters, vol. 13, May 16, 2014.

(Continued)

*Primary Examiner* — Hai V Nguyen (57) ABSTRACT

A wireless receiver wireless receiver unit (200) having a plurality of antennas comprises a spatial phase corrector circuit (234) connected to a first and second receiver (220, 222) and comprises: a computation circuit (330) configured to generate a spatial-covariance matrix, SCM, of a received first and second AM signal; a signal decomposition circuit (334) configured to generate an Eigen-value decomposition, EVD, (336) of the SCM; and a processor (340) configured to analyse the EVD of the SCM of the received first and second AM signal and select and output a principal Eigen-vector that is representative of at least a first weight (350) and a second weight (352). A combiner (240) is configured to apply the first weight (350) to the first AM signal received and apply the second weight (352) to the second AM signal received and coherently combine and output (250) the received weight-applied first and second AM signal.

20 Claims, 4 Drawing Sheets

(56) References Cited

U.S. PATENT DOCUMENTS

| | | | |
|---|---|---|---|
| 6,208,295 B1* | 3/2001 | Dogan | G01S 3/74 |
| | | | 342/361 |
| 6,215,983 B1* | 4/2001 | Dogan | H04L 25/03993 |
| | | | 375/325 |
| 6,369,758 B1* | 4/2002 | Zhang | H04L 27/2613 |
| | | | 342/383 |
| 6,477,161 B1* | 11/2002 | Hudson | H04B 7/0615 |
| | | | 375/267 |
| 6,504,506 B1* | 1/2003 | Thomas | H04B 7/0848 |
| | | | 342/383 |
| 6,658,234 B1* | 12/2003 | Dogan | G01S 3/74 |
| | | | 455/305 |
| 6,697,633 B1* | 2/2004 | Dogan | H04B 7/086 |
| | | | 455/450 |
| 6,754,511 B1* | 6/2004 | Halford | H04B 7/10 |
| | | | 455/562.1 |
| 6,826,240 B1* | 11/2004 | Thomas | H04L 25/022 |
| | | | 375/340 |
| 7,039,368 B2* | 5/2006 | Brunner | H01Q 3/26 |
| | | | 455/562.1 |
| 7,096,041 B2* | 8/2006 | Brunner | H04B 7/0634 |
| | | | 342/368 |
| 7,369,715 B2* | 5/2008 | Darcie | H04B 10/66 |
| | | | 385/2 |
| 7,656,936 B2* | 2/2010 | Li | H04B 1/71055 |
| | | | 375/348 |
| 8,174,138 B2* | 5/2012 | Castelli Dezza | H02M 7/25 |
| | | | 290/43 |
| 8,532,215 B2* | 9/2013 | Huang | H04L 25/03343 |
| | | | 375/267 |
| 9,735,940 B1* | 8/2017 | Bakr | H04W 4/06 |
| 9,929,790 B2* | 3/2018 | van Houtum | H04B 7/12 |
| 10,014,893 B2* | 7/2018 | van Houtum | H04B 17/20 |
| 10,014,916 B2* | 7/2018 | Yuan | H04B 17/373 |
| 10,142,004 B2* | 11/2018 | Park | H04L 25/0224 |
| 10,348,394 B1* | 7/2019 | Bakr | H04L 5/14 |
| 2002/0122473 A1* | 9/2002 | Leblond | H04B 7/0848 |
| | | | 375/346 |
| 2003/0108028 A1* | 6/2003 | Brunner | H04B 7/0854 |
| | | | 370/347 |
| 2003/0130012 A1* | 7/2003 | Brunner | H04B 7/0854 |
| | | | 455/562.1 |
| 2003/0144032 A1* | 7/2003 | Brunner | H04B 7/0634 |
| | | | 455/562.1 |
| 2003/0157967 A1* | 8/2003 | Saunders | H04B 7/0854 |
| | | | 455/562.1 |
| 2004/0082299 A1* | 4/2004 | Brunner | H04B 7/0615 |
| | | | 455/562.1 |
| 2004/0125899 A1* | 7/2004 | Li | H04B 7/0857 |
| | | | 375/347 |
| 2004/0146024 A1* | 7/2004 | Li | H04B 7/0851 |
| | | | 375/E1.027 |
| 2006/0183439 A1* | 8/2006 | Erceg | H04L 1/1867 |
| | | | 455/101 |
| 2007/0021085 A1 | 1/2007 | Kroeger | |
| 2007/0041735 A1* | 2/2007 | Darcie | H04B 10/66 |
| | | | 398/186 |
| 2008/0063399 A1* | 3/2008 | Mallya | H04Q 11/0071 |
| | | | 398/75 |
| 2009/0273956 A1* | 11/2009 | Castelli Dezza | H02M 7/25 |
| | | | 363/67 |
| 2011/0064171 A1* | 3/2011 | Huang | H04L 25/03343 |
| | | | 375/346 |
| 2012/0082274 A1* | 4/2012 | Bury | H04L 25/0202 |
| | | | 375/346 |
| 2014/0314164 A1* | 10/2014 | Zhao | H01J 35/147 |
| | | | 378/138 |
| 2016/0050248 A1* | 2/2016 | Gayl | H04L 65/4046 |
| | | | 709/219 |
| 2016/0099778 A1* | 4/2016 | Maricevic | H04B 10/2575 |
| | | | 398/115 |
| 2016/0135180 A1* | 5/2016 | Yuan | H01Q 21/22 |
| | | | 370/329 |
| 2016/0142119 A1 | 5/2016 | Van Houtum | |
| 2017/0331545 A1* | 11/2017 | van Houtum | G01S 3/48 |
| 2017/0373745 A1* | 12/2017 | Park | H04B 7/0478 |
| 2018/0063826 A1* | 3/2018 | Kim | H04B 7/0695 |
| 2018/0083660 A1* | 3/2018 | van Houtum | H04B 7/086 |
| 2019/0036573 A1* | 1/2019 | Park | H04B 7/0417 |
| 2019/0044589 A1* | 2/2019 | Park | H04B 7/0408 |
| 2019/0312623 A1* | 10/2019 | Park | H04B 7/06 |
| 2019/0356347 A1 | 11/2019 | Van Houtum | |
| 2020/0007205 A1* | 1/2020 | Park | H04B 7/0469 |
| 2022/0029697 A1* | 1/2022 | Bakr | H04L 5/14 |

OTHER PUBLICATIONS

Jacobsen, N., "Noncoherent eigenbeamforming and interference suppression for outdoor OFDM systems", IEEE Transactions on Communications, vol. 56, No. 6, Jun. 13, 2008.

Proakis, J., "Digital Communications", 5th-edition, ISBN-978-0-07-295716-7, Jan. 2018.

Schneider, J., "The Development of the Directional AM Broadcast Antenna", Spectrum Monitor magazine article, Jun. 14, 2019.

Van Trees, H., "Optimum Array Processing: Part IV of Detection, Estimation, and Modulation Theory", Wiley Interscience, ISBN 0-471-22110-4, Mar. 22, 2002.

* cited by examiner

WIRELESS RECEIVER UNIT, SPATIAL PHASE CORRECTOR CIRCUIT FOR AMPLITUDE MODULATION AND METHOD THEREFOR

CROSS-REFERENCE TO RELATED APPLICATIONS

This application claims the priority under 35 U.S.C. § 119 of European Patent application no. 21171341.7, filed on 29 Apr. 2021, the contents of which are incorporated by reference herein.

FIELD OF THE INVENTION

The field of the invention relates to a wireless receiver unit, a spatial phase corrector circuit for amplitude modulation, and a method therefor. The invention is applicable to, but not limited to, automotive radio reception systems that employ frequency modulation and amplitude modulation circuits therein.

BACKGROUND OF THE INVENTION

In Amplitude Modulation communications, a high frequency sine wave is used as a carrier wave. If the amplitude of the high frequency carrier wave is varied in accordance with the instantaneous amplitude of the modulating signal, then such a technique is referred to as Amplitude Modulation (AM). This means that the amplitude of the carrier signal containing no information varies as per the amplitude of the signal containing information, at each instant. Here, the bandwidth (BW) of the AM signal is the difference between the highest and lowest frequencies of the signal. It can be said that the bandwidth required for amplitude modulated wave is twice the frequency of the modulating signal. The power of an AM signal is equal to the sum of powers of the carrier, the upper sideband, and the lower sideband frequency components. Note, if the modulation index (that is the ratio between message- and carrier-amplitude) equals one, then the power of the AM wave is equal to 1.5 times the carrier power. So, the power required for transmitting an AM wave is 1.5 times the carrier power for a perfect modulation.

AM receivers have found recent popularity in the automotive radio reception business as part of Frequency-Modulation (FM)/Amplitude-Modulation (AM) automotive integrated circuits (ICs), based on digital signal-processing (DSP). In the automotive-sector, designs at typical AM frequencies are limited to (at most) two antennas, i.e., two-paths, due to the typically low frequencies of operation and the need to separate the antennas by a half wavelength of the operating frequency.

Figure 1:
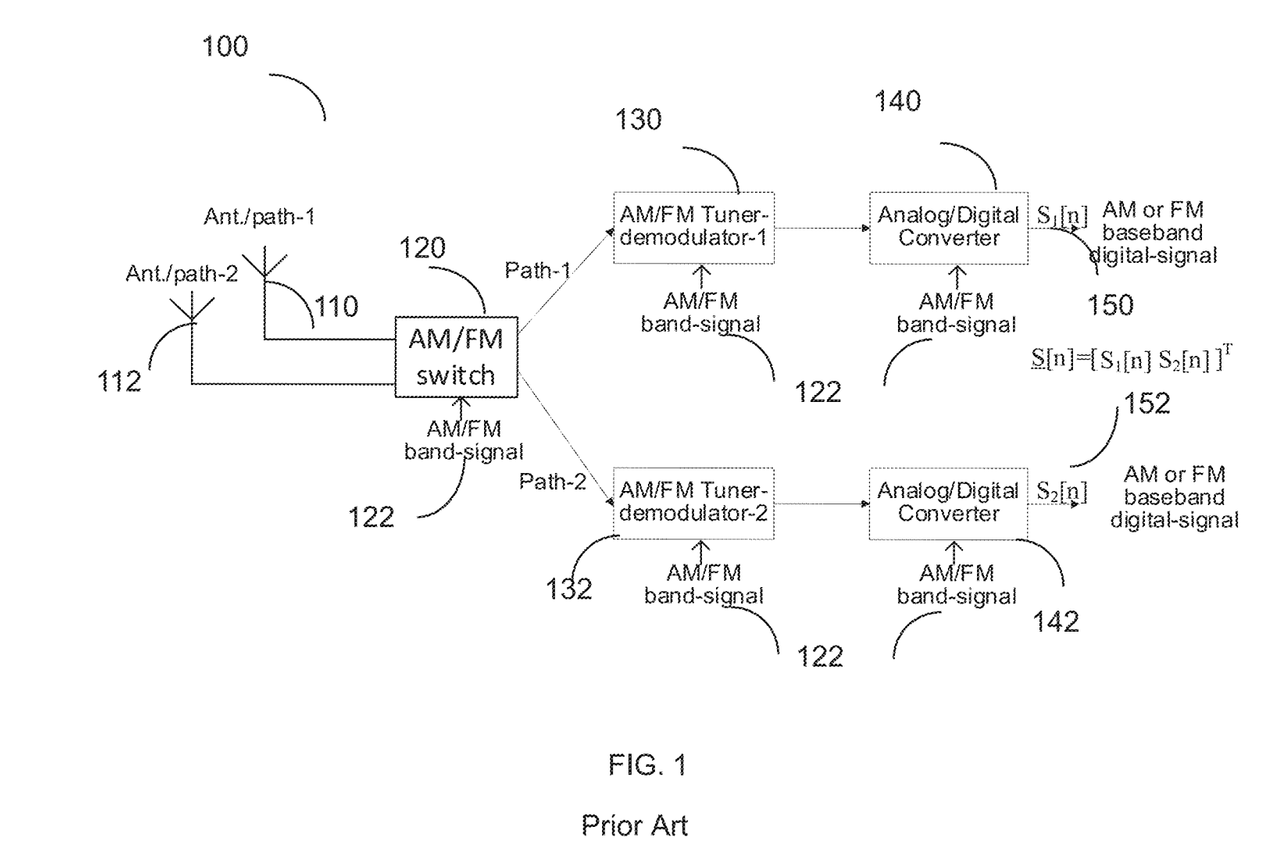
FIG. 1 illustrates a simplified drawing of a known radio frequency (RF) receiver unit suitable for automotive FM/AM reception.

FIG. 1 illustrates a simplified drawing of a known radio frequency (RF) receiver unit 100 suitable for automotive FM/AM reception. The known RF receiver unit 100 includes a two-path FM/AM system with two antennas 110, 112 receiving and providing respective FM/AM signals to an FM/AM switch 120, which is controlled by an AM/FM band selection signal 122. The selected FM/AM signal is then routed to either a first path with a first AM/FM tuner and demodulator 130 or a second AM/FM tuner and demodulator 132 that are also controlled by an AM/FM band selection signal 122. The AM/FM tuner and demodulators 130, 132 are required to fine-tune the frequency and demodulate the received signals, so that they are suitable for baseband processing. The respective outputs of the first AM/FM tuner and demodulator 130 and second AM/FM tuner and demodulator 132 are input to respective first and second analogue to digital converters 140, 142 that are also controlled by the AM/FM band selection signal 122. The respective digital (selected) AM or FM baseband outputs 150, 152 of the first or second analogue to digital converters 140, 142 can then be listened to.

With a two-path FM/AM system, as illustrated, the first AM/FM tuner and demodulator 130 and second AM/FM tuner and demodulator 132 are required to fine-tune the baseband processing as well as to synchronize the signal phases between the two paths. In a two-antenna automotive radio reception system, where tuners with AM and FM are employed, it is known that the signals provided by the respective antennas are phase-shifted versions of each other, i.e., the same signal received slightly earlier or later at each antenna that results in a phase shift of that signal. In order to correct for these phase shifts in an FM system, it is known to use FM phase-diversity techniques, such as Maximum Ratio Combining (MRC), in order to achieve better sensitivity and lower coverage outage.

One known technique to improve the sensitivity of AM reception using two separated antennas is described in B. W. Kroeger, "Adaptive beamforming for AM radio", US patent US 2007/0021085A1, Jan. 25, 2007, which proposes a complex and costly AM solution whereby dedicated loop antennas are placed in perpendicular polarizations. Another known technique to improve the sensitivity of AM reception using two separated antennas is described in J. H. Han and N-H Myung, "Novel Feed Network for Circular Polarization Antenna Diversity", IEEE Antennas and Wireless Propagation Letters, vol. 13, pp 979-982, May 2014, which proposes a complex and costly AM solution whereby circularly polarized antennas with left-hand circular polarization and right-hand circular polarization are used. An improved AM reception technique, particularly for automotive applications that offer FM/AM reception, is therefore desirable.

SUMMARY OF THE INVENTION

Embodiments of the present invention provide a wireless receiver unit, a spatial phase corrector circuit for amplitude modulation and a method therefor, as described in the accompanying claims. Specific embodiments of the invention are set forth in the dependent claims. These and other aspects of the invention will be apparent from, and elucidated with reference to, the example embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Examples of the present invention aim to provide an improved AM reception technique, particularly for automotive applications that offer a combination of FM/AM reception, where the AM reception is able to use the spatially separated FM antennas and the AM reception is able to use circuits that are configured to employ linear transformation techniques and probability theories. Examples of the present invention utilize eigenvalues and eigenvectors, which feature prominently in the analysis of linear transformations. In linear algebra, an eigenvector (sometimes referred to as characteristic vector) of a linear transformation is a non-zero vector that changes at most by a scalar factor, when that linear transformation is applied to it. The corresponding eigenvalue, often denoted by $\lambda$ is the factor by which the eigenvector is scaled. The eigenvector corresponding to the eigenvalue of largest magnitude is called the principal eigenvector. Some examples of the present invention may also utilize Principal Component Analysis (PCA), which is a dimensionality-reduction method that is often used to reduce the dimensionality of large data sets, for example by transforming a large set of variables into a smaller set of variables that still contains most of the information in the large set. PCA is one example of a known tool that is typically used for finding patterns in high-dimensional data, such as images. Some examples of the present invention may also utilize spatial-covariance matrix (SCM). In probability theory and statistics, covariance is a measure of how much two variables change together, and the covariance function (or kernel) describes the spatial or temporal covariance of a random variable process or field.

Examples of the present invention provide a wireless receiver unit having multiple antennas that includes at least a first antenna connected to a first receiver by a first receiver path and a second antenna connected to a second receiver by a second receiver path, wherein the first receiver and second receiver are configured to receive and frequency downconvert at least an Amplitude Modulated, AM, signal from their respective antennas. A spatial phase corrector circuit is connected to the first receiver and second receiver and comprises: a computation circuit configured to generate a spatial-covariance matrix, SCM, of the received AM signal; a signal decomposition circuit coupled to the computation circuit and configured to generate an Eigen-value decomposition, EVD, of the SCM of the received AM signal; and a processor coupled to the signal decomposition circuit and configured to analyse the EVD of the SCM of the received AM signal and select a principal Eigen-vector that is representative of at least a first weight and a second weight. In some examples, the principle EVD may be used to obtain the two distinct weights to be applied to the AM signals on the two respective AM receiver paths in accordance with equations [4]-[13] below. A combiner has a first input operably coupled to the first receiver for receiving the AM signal via the first receiver path and has a second input coupled to the second receiver for receiving the AM signal via the second receiver path and has a third input coupled to the spatial phase corrector circuit and configured to receive the at least first weight and second weight. The combiner is configured to apply the first weight to the AM signal received via the first receiver path and apply the second weight to the AM signal received via the second receiver path and thereby coherently combine the weighting-applied received AM-signals.

In this manner, the spatial phase corrector circuit and combiner cooperate to improve sensitivity of an AM receiver unit by coherent addition of the received AM signals, despite the fact that these receiver paths and their associated antennas are spaced very closely together for AM operation. Advantageously, the spatial phase corrector circuit benefits from having two independent, respective AM receiver paths. Furthermore, coherent addition of the received weight-applied AM signals, which improves the sensitivity of the received AM signals, is performed before AM processing of the received signal(s) takes place.

By using an EVD and a processor (for example a processor that employs, say, a Principal Component Analysis (PCA) method to select a principal Eigen-vector that is representative of at least a first weight and a second weight), coherent combining of two (pre-existing) AM paths may be achieved. In some examples, a two-by-two spatial covariance matrix may be obtained and, for example, a Cayley-Hamilton approach used to identify the Eigen-vectors. In some examples, the largest Eigen-vector (i.e. the principal Eigen-vector) may then be selected. This largest Eigen-vector comprises two components, i.e., complex numbers, that may be used to represent the two weights, the first weight and the second weight, to be applied to the respective AM receiver paths. The first weight may then be applied to one path, with the second weight applied to the other path, in order to rotate and scale both paths in such a way that they will be constructively added. Hence, in some examples, there a combining-gain or 'increase of antenna-aperture' may be obtained using such baseband signal processing. The coherent combining may be achieved irrespective of the wavelength of the AM carrier frequency being, for example, roughly a factor of 100 lower than the FM carrier-frequency in a joint FM/AM automotive radio reception design. Such an approach enables coherent addition to be applied in an AM scenario, for example for a mobile or automotive receiver unit that has not previously been able to consider coherent addition due to the typical AM carrier frequencies that are used.

In some examples, the coherent combining provides phase alignment (i.e., corrects any phase mis-alignment) of the respective AM signals on the two AM receiver paths, where the correction may facilitate an increase in the effective antenna apertures of the respective receiving AM antennas and thereby improve sensitivity of AM reception. Examples of the invention have exhibited a 2-3 dB sensitivity improvement.

In the context of current automotive radio reception systems, chip-sets support both AM and FM operation, but only one of the known AM-FM tuners (130, 132 in FIG. 1) is used for AM reception, as the second path is unable to be used for AM purposes (due to the spatial diversity benefits of a two-path, two-antenna approach only being achievable for the FM frequencies). However, examples of the present invention are advantageously able to use both AM-FM tuners for AM operation (i.e. the previous delinquent AM tuner can now be used), as a two-path AM approach can be used, despite the limited separation of the antennas set for FM spatial diversity.

In some examples, the eigen-value decomposition may be only executed, say, once in roughly 2000 baseband samples and is a relatively straightforward computation due to the SCM being in some examples a two-by-two matrix, following a use of two antennas, and as such exhibits a quadratic characteristic function that can be solved to generate a single Eigen-value. This single eigen-value may then be subtracted from one column of the matrix, say, the 2×2 SCM (for example using the Cayley-Hamilton theorem to obtain the Eigen-vector, as known to those skilled in the art). Once the eigen-vector is known, the weights (e.g., coefficients) to adapt the AM signal on both receiver paths can be obtained, in order to apply the respective weight(s) to the respective two receiver AM signal paths, which are then ultimately coherently combined.

Figure 3:
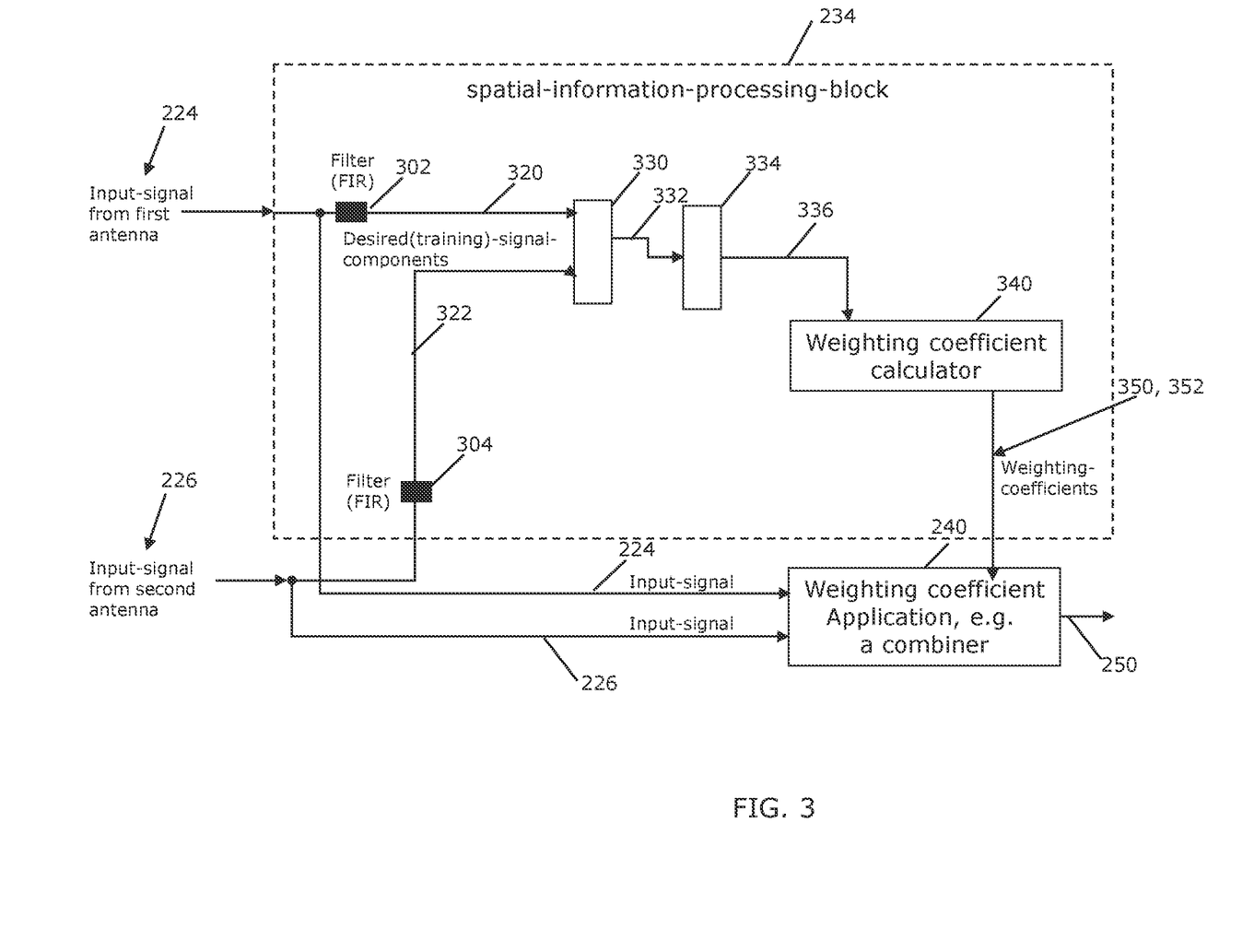
FIG. 3 illustrates one example of a spatial phase corrector circuit for amplitude modulation, according to example embodiments of the invention.

In some examples, the spatial phase corrector circuit may comprise, or be operably coupled to, at least one filter arranged in order to filter the received first AM signal and second AM signal and output a filtered representation of desired AM components of the received first AM signal and second AM signal. In some examples, the at least one filter may comprise at least one of: a finite impulse response filter (FIR); an infinite impulse response filter (IIR). In this manner, (clean, filtered, i.e., with undesired noise components reduced appropriately) samples of the input AM signals may be processed and used to identify weights to be applied to the received first input AM signal and second input AM signal.

In some examples, samples of the input AM signals may be used to obtain the respective weights to be applied to each AM signal path. In some examples, for the at least one filter 302, 304, instead of a 24-tap FIR filter being used, a 27-tap FIR filter may be employed, which is a nominal additional complexity to a digital processing designer, (and in some cases may be even smaller tap FIR filter may be used if the input filter for the SCM is able to transition from 24+3 taps to 20 taps, for example). In some examples, a covariance matrix may be calculated using the samples of the input AM signals in order to generate the weights, which may be beamforming (BF) weights. In some examples, such a covariance matrix may be calculated using two multiplication operations and two addition operations per sample, with the weights calculated using such a 2*2 matrix by solving a quadratic equation. In some examples, analysis of the received samples of the input AM signals on the two receiver paths may be achieved by computing a SCM only once per block of multiple samples, e.g., a block of say, 2160 samples, a low-complexity (for example two-by-two) SCM in baseband/digital processing, if a two-AM receiver path design is used. Applying the weights to the incoming AM samples requires two multiplication operations and one addition operation for two samples, for example using equation [2] and equation [13] below.

In some examples, the spatial phase correction (SPC) circuit with coherent addition/combining may be implemented using digital signal processing of a discrete (continuous-wave) AM baseband signal. In some examples of the invention, such AM signals may include either a central-DC-part representing the carrier frequency (full-carrier (FC)) or not (known as 'suppressed-carrier' (SC)), or either a lower-sideband signal (i.e., below the central-part) and an upper-sideband signal (i.e., above the central-part) in a double-side-band (DSB) arrangement. In some examples, the AM signal may be a single-side-band (SSB) signal or vestigial side band (VSB) design that represents the analogue (continuous-wave) message information.

In some examples, the AM receivers may be used in an analogue radio system or an analogue television broadcast system. However, example embodiments will be described in a context of an AM/FM radio broadcast system, for example where the carrier-frequency is around 1 MHz and the lower and upper-sidebands of the AM signals have a bandwidth of, say, up to 10 KHz the so-called; "Double Side Band Full Carrier (DSBFC) AM-radio broadcast system". In this manner, the coherent combining of AM signals received on two antennas, as described herein, may be employed where the two antennas are actually configured for FM reception. A skilled artisan will understand that spatial-based algorithms that are able to use a distance between two (or more) antennas are typically limited to a wavelength of $\lambda/2$, which in an FM scenario at FM frequencies is approx. 1.5 m, whereas in an AM scenario at AM frequencies is approx. 150 m. Hence, spatial-based algorithms are rarely/never considered for AM system.

For improved reception, i.e., higher sensitivity, of the AM-signals within a multiple-antennas receiver scenario with very closely spaced antennas in the order of distances that are thousandths up to hundredths of one wavelength, example embodiments propose a spatial phase correction circuit for the AM signals. The principle of the spatial phase correction circuit is that the received power of each antenna or receiver path is adjusted in phase and amplitude (as the weights being applied are complex numbers) in such a way that the received AM signals of each antenna can be constructively (coherently) combined. In some examples, this constructive combining may be accomplished by a so called "delay-sum beam forming (BF)" process based on a computation of a SCM with an Eigenvalue decomposition (EVD), where the principal Eigenvector is used to provide the BF weights. In some examples, these BF weights may be applied to the multiple antennas (highly-correlated) AM signals for coherent combining and obtain a signal-to-noise ratio (SNR) improvement of $10 \log_{10}(NRX)$ dB with NRX the number of AM receiver antennas.

In some examples, the SNR reception improvement of the received AM signals may be obtained with digitally computed phase-differences ('spatial information') of multiple (two) antennas, e.g., an Uniform Linear Array (ULA) consisting of two isotropic antennas. To compute the phase-difference (e.g., spatial information) between the two received AM signals, some examples of the invention employ processing of complex baseband signals with phase and amplitude estimations. In some examples, the complex baseband signal processing may determine delay-sum beamform (BF) weights, sometimes referred to as electronically-steered complex baseband delay-sum BF, where the BF weights are applied at baseband. In some examples, this type of delay-sum BF for spatial phase correction, i.e., one that can perform coherent combining by weighting (highly-correlated) AM signals and combining them, is optimal in a Signal-to-Noise Ratio (SNR) sense.

In some examples, it is envisaged that the circuit may be implemented using discrete components and/or circuits, whereas in other examples the circuit may be formed in integrated form in an integrated circuit (IC), such as a SPC IC. A skilled artisan will appreciate that the level of integration of receiver circuits or components may be, in some instances, implementation-dependent. Clearly, the various components within the wireless receiver unit can be realized in discrete or integrated component form, with an ultimate structure therefore being an application-specific or design selection. Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 2:
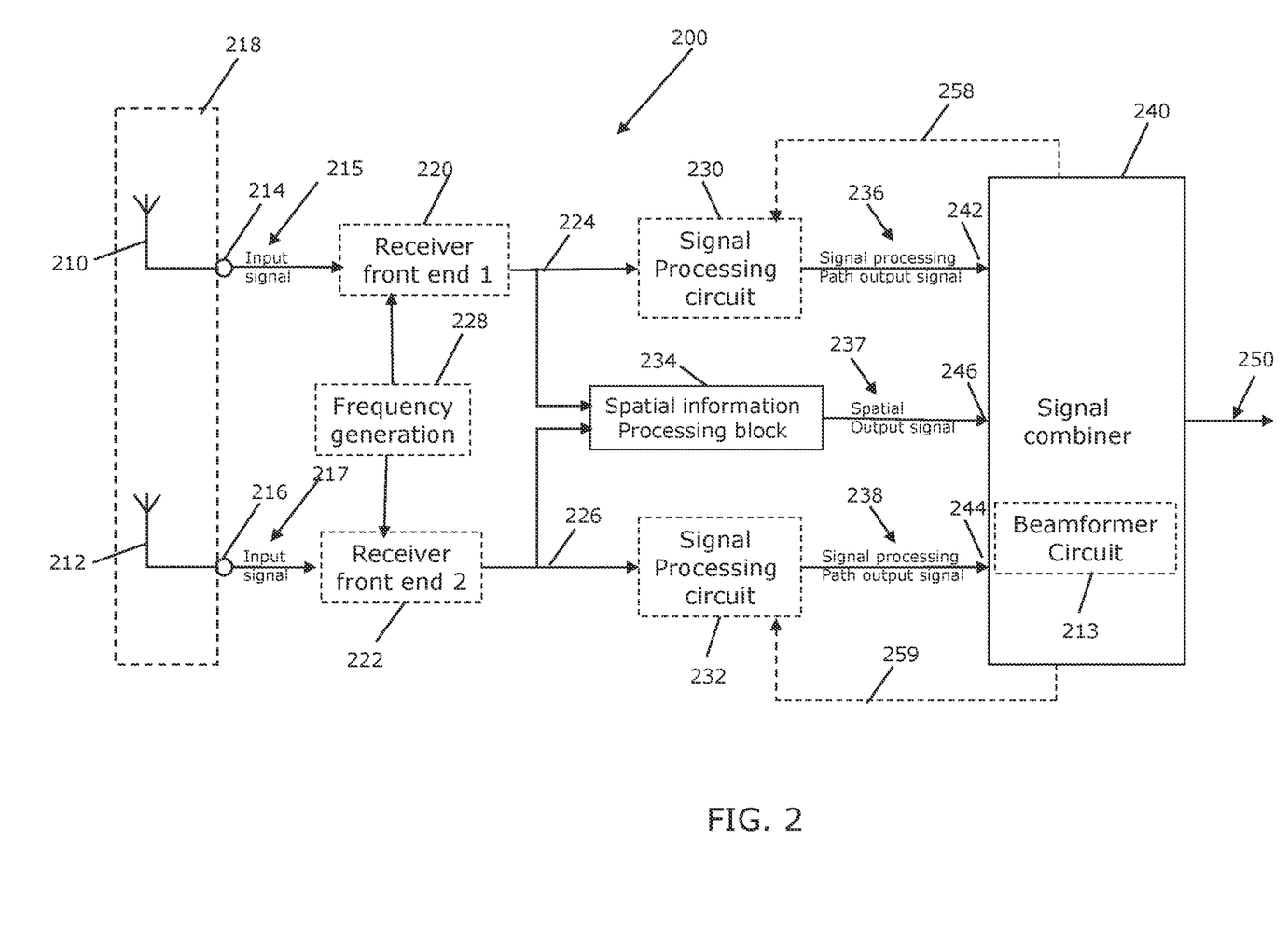
FIG. 2 illustrates one example of a wireless radio frequency (RF) receiver unit suitable for automotive FM/AM reception, adapted according to example embodiments of the invention.

Referring now to FIG. 2, one simplified block diagram example of a wireless radio frequency (RF) receiver unit 200 suitable for automotive FM/AM reception is illustrated, which has been adapted according to example embodiments of the invention. The example wireless RF receiver unit 200 comprises a plurality of antennas, which in some examples may be an antenna array 218 and in other examples may be multiple distinct antennas, such as a two-antenna 210, 212 FM automotive radio reception system. Each of the multiple antennas 210, 212 has a connection 214, 215 to a respective receiver chain, as known in the art, each of which include(s) receiver front-end circuits 220, 222 (effectively providing reception, low-noise amplification, filtering and intermediate or baseband frequency conversion). In example embodiments, the receiver front-end circuits 220, 222 convert the received RF amplitude modulated (AM) (and frequency modulated (FM)) signals to respective baseband signals using a local oscillator signal provided by a frequency generation circuit 228 and output the frequency down-converted signals 224, 226 to low pass filter(s) (LPFs) (not shown). The received signals provided by the respective antennas 210, 212 are phase-shifted versions of each other, i.e., the same signal received slightly earlier or later between the two antennas 210, 212 that results in a phase shift of that same signal. The wireless receiver unit 200 may comprise one or more signal processor(s) 230, 232, which may be of the form of a digital signal processor (DSP) configured to process the respective frequency down-converted signals 224, 226 on each signal processing path. A controller and a timer (not shown) may control the timing of operations (e.g., reception of time-dependent signals) within the wireless receiver unit 200.

In accordance with example embodiments, the respective frequency down-converted signals 224, 226 are also input to the SPC circuit 234 in order to obtain the necessary weights for adapting the AM signals received on the antennas 210, 212, in order to adapt and correct phase mis-aligned frequency down-converted AM signals due to the FM-spaced antennas providing different reception of AM signals.

In this example, the SPC circuit 234 comprises: a computation circuit (not shown, but described later) configured to generate a spatial-covariance matrix, SCM, of the received frequency down-converted AM signals; a signal decomposition circuit coupled to the computation circuit and configured to generate an Eigen-value decomposition, EVD, of the SCM of the received frequency down-converted AM signal; and a processor coupled to the signal decomposition circuit and configured to analyse the EVD of the SCM of the received frequency down-converted AM signal and select a principal Eigen-vector that is representative of at least a first weight and a second weight (as described with respect to FIG. 3). In one example, the selected principal Eigen-vector is representative of at least a first weight and a second weight and may be applied to phase adjustment or gain adjustment circuits in the respective signal processing circuits 230, 232.

In some examples, a two-by-two spatial covariance matrix may be obtained and, for example, a Cayley-Hamilton approach used to identify the Eigen-vectors. The largest Eigen-vector (i.e. the principal Eigen-vector) may then be selected. This largest Eigen-vector comprises two components, i.e., complex numbers that are representative for the two weights, the first weight and the second weight. The first weight may then be applied to one path, with the second weight applied to the other path, in order to rotate and scale both paths in such a way that they will be constructively added. Hence, in some examples, there is a combining-gain or 'increase of antenna-aperture' obtained by baseband signal processing.

A signal combiner 240 has a first input port 242 operably coupled to the first receiver for receiving the AM signal via the first (signal processing) receiver path and has a second input port 244 coupled to the second receiver for receiving the AM signal via the second (signal processing) receiver path and has a third input port 246 coupled to the SPC circuit 234 and configured to receive a calculated at least first weight and second weight 237. In one example, the signal combiner 240 is configured to apply the first weight to the AM signal received via the first receiver path and apply the second weight to the AM signal received via the second receiver path and coherently combine the received AM-signals into a single output AM signal 250.

The combination of SCM and EVD in a multi-path (multiple antenna system) AM receiver unit 200 with very closely-spaced antennas 210, 212, e.g., thousandths up to hundredths of one AM wavelength, results in the SPC circuit 234 with the signal combiner 240 producing an optimal Signal-to-Noise Ratio (SNR) combination of AM-signals from the at least two antennas. In some examples, the process of optimizing the SNR may be performed using a beamforming (BF) process (using BF weights either at baseband by a beamformer circuit 213 by calculating the SCM, performing an EVD on the SCM, analysing the EVD of the SCM of the received AM signal and selecting a principal Eigen-vector that is representative of at least a first weight and/or a second weight, and applying the outcome, i.e., the principal Eigen-vector, as delay-sum BF-weights. In some examples the plurality of antennas may be an antenna array 218 and in other examples may be multiple distinct antennas 210, 212.

Alternatively, in some examples, weights 258, 259 may be applied in (optional) signal processing circuits 230, 232 respectively located in the first receiver path and second receiver path, for example where the selected principal Eigen-vector that is representative of at least a first weight and/or a second weight may be used to adjust at least one of a gain and/or amplitude in phase adjustment or gain adjustment circuits, in order to align the amplitude and/or phase of the AM signals in each receiver path. In this manner, the SPC circuit 234 has pre-adjusted the signal phases and/or amplitudes of the AM signals prior to the signal combiner 240 in order to facilitate coherent combining of the (continuous-wave) AM signals in signal combiner 240, irrespective of the received AM signals being obtained from very closely spaced receiver (FM) antennas.

Referring now to FIG. 3, one example of a SPC circuit 234 for amplitude modulation is illustrated, according to example embodiments of the invention. The illustrated example in FIG. 3 employs an (electronically-steered) beamforming approach that results in coherent combining of multiple, in this case two, AM signals. In this example, the SPC circuit 234 receives respective frequency down-converted signals, i.e., the first input AM signal 224 and second input AM signal 226. In this example, the frequency down-converted signals are respectively input into at least one filter 302, 304. In some examples, the at least one filter 302, 304 may comprise at least one of: a finite impulse response filter (FIR), which uses feed-forward processing and provides a constant group-delay thanks to its linear phase; an infinite impulse response filter (IIR), which requires feedback processing. In this manner, the at least one filter 302, 304 reduces appropriately undesired noise components and provides clean, filtered, samples of the input AM signal components 320, 322 that can be processed to identify weights to be applied to the received first input AM signal 224 and second input AM signal 226. In some examples, as illustrated, the spatial phase corrector circuit 234 comprises the at least one filter 302, 304 arranged to filter the received first AM signal and second AM signal and output a filtered representation of desired AM components 320, 322 of the received first AM signal and second AM signal. In other examples (not shown), the at least one filter 302, 304 may be located outside of the SPC circuit 234 but operably coupled between the antennas and the SPC circuit 234.

The SPC circuit 234 includes a computation circuit 330 coupled to each receiver path, configured to generate a spatial-covariance matrix, SCM, 332 of the clean, filtered, samples of the input AM signal components 320, 322. Computation circuit 330 receives the filtered first input signal components 320 from the first antenna and the filtered second input signal components 322 from the second antenna and outputs the SCM 332 (which is a representation of the combination of the filtered input signals). In this example, the calculation of the weights is only based on desired-signal components since undesired components (other than thermal-noise) have been removed (in accordance with specifically equation [12] and equation [13] below).

The SCM 332 is input to a signal decomposition circuit 334 configured to generate an Eigen-value decomposition, EVD, of the SCM of the received AM signal. An output 336 of signal decomposition circuit 334 is input to a processor 340 coupled to the signal decomposition circuit 334, arranged to calculate one or more weighting coefficients. The processor 340 is configured to analyse the EVD of the SCM of the received AM signals and select a principal Eigen-vector that is representative of at least a first weight 350 and/or a second weight 352. In this example, the complex numbers of the first weight 350 and the second weight 352 may be applied to the received first and second input-signals 224 and 226 within combiner 240 according to equation [14]. In this manner, a spatial output signal 250 from the combiner 240 includes coherently-combined, weight-adjusted versions of the received AM input signal. After, the constructive combining of the two receiver paths by applying the identified weights, e.g., in principle improving the AM sensitivity of the received AM signals, subsequent AM-processing (not shown) may be performed.

The combination of SCM and EVD in a multi-path (multiple antenna system) AM receiver unit with very closely-spaced antennas produces an optimal Signal-to-Noise Ratio (SNR) combination of AM signals of at least two antennas. In some examples, this process of optimizing the SNR may be performed using a BF process by calculating the SCM, performing an EVD on the SCM, to analyse the EVD of the SCM of the received AM signal and select a principal Eigen-vector that is representative of at least a first BF weight and/or a second BF weight, and applying the outcome, i.e., the principal Eigen-vector, as delay-sum BF weights in BF circuit 213.

Although this example of FIG. 2 shows the combiner 240 comprising the BF circuit 213, which is configured to apply by (complex) multiplication the first weight to the first AM signal received and apply by (complex) multiplication the second weight to the second AM signal received and do the (complex) addition of the multiplied signals with the weights, it is envisaged that in other examples that the BF circuit 213 may reside outside of, but operably coupled to, the combiner 240.

As understood by a skilled person, an EVD returns/represents a diagonal matrix 'D' of eigenvalues and a matrix 'V' whose columns are the corresponding correct Eigenvectors, so that $A*V=V*D$. This relationship is used to obtain the optimum-weights as described in equations [9]-[13], e.g., optimal combining in SNR-sense of the receive paths. Thus, solving the Eigen-value problem provides the Eigen-vector, or equivalently the optimal-weights. Combiner 240 is configured to multiply each sample 236 output from first processor 230 with a first weight (i.e., Eigen-vector $1^{st}$ component) and configured to multiply each sample 238 output from second processor 232 with a second weight (I.e., Eigen-vector $2^{nd}$ component). The combiner 240 then adds these two multiplied samples of each path to form 250, as also shown in equation 14. Thus, in some examples, BF circuit 213 is not required at all.

Alternatively, the weights may be applied as phase and/or gain adjustments applied to phase shifters or variable gain circuits (not shown) in signal processing circuits 230, 232. In this manner, the SPC circuit 234 is able to adjust the signal phases and amplitudes of the AM signals to facilitate coherent combining of the (continuous-wave) AM-signals in signal combiner 240, irrespective of the received AM signals being obtained from very closely spaced receiver (FM) antennas.

In contrast to known beamforming approaches, the claimed present invention, obtains and applies the BF weights to result in constructive (coherent) combining of the received AM signals. These BF weights are obtained by the computation of the SCM of the desired signal and applying an EVD on this matrix, i.e., taking the principal eigenvalue of the SCM of the desired signal. Thereafter, by analysing the EVD of the SCM of the received AM signal and selecting a principal Eigen-vector that is representative of at least a first weight and a second weight, for example by employing a Principal Component Analysis (PCA) method on the EVD of the SCM, it is possible to obtain an efficient selection, in terms of SNR, of the beamform weights to apply coherent combination of the AM signals.

Figure 4:
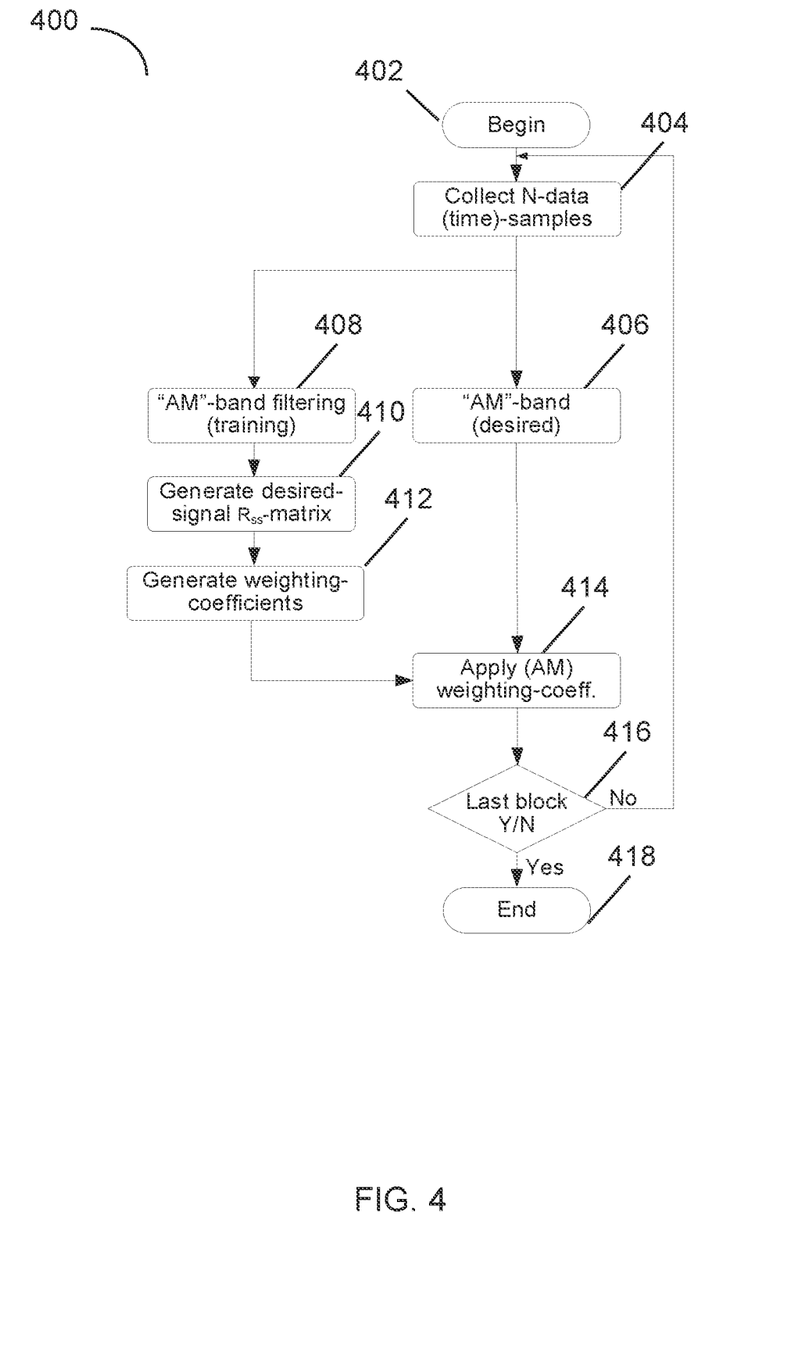
FIG. 4 illustrates one example of a flowchart of spatial phase correction for amplitude modulation for a wireless RF receiver unit, according to example embodiments of the invention.

Referring now to FIG. 4, one example of a flowchart 400 of spatial phase correction for amplitude modulation for an RF receiver unit is illustrated, according to example embodiments of the invention. The example flowchart 400 of spatial phase correction begins at 402 with a received, demodulated, baseband AM signal at, say 46.5 KHz. At 404, a set of N-data samples is collected. In this example, at 406, the collected set of N-data samples forms the 'desired' AM signal.

Substantially concurrently, in some example embodiments and at 408, samples of the input signals are processed and used to identify weights to be applied to the received first input AM signal 214 and second input AM signal 216. In some examples, the sampled input signal may be a filtered version of the original AM signals, for example located within the filter bandwidth, e.g., 5 KHz around DC, to be still representative of the desired AM signal, i.e., with undesired noise components reduced appropriately (filtered) therefrom. In some example embodiments, a beamforming circuit 213 may be used to apply the weights, whereas in other example embodiments a BF circuit is not needed. At 410, the computations of the beamforming weights is based on a (sample) covariance matrix of the desired signal, $R_{ss}$. Moreover, at 412, the weights may then be generated/computed, for example by using the so called; "estimation-and-plug" technique. In examples of the invention, this is achieved by solving an eigenvalue problem, for example using a principal component analysis method. Consequently, the proposed complex baseband BF antenna adjustment approach is fast, i.e., it has a low latency.

With, for example, the illustrated two beamforming antenna approach, there are two weights, i.e., two complex numbers that are computed or estimated at 412. In some example embodiments, in order to combine, at 414 (such as in combiner 240 in FIG. 2), the desired signal at 406, with the pair of weights shown by the (AM) weighing coefficients obtained at 412.

At 412 in some examples, the generation of the weighting coefficients may be based on an approach to maximize the SNR of the received AM signal. In this manner, the generation of the weighting coefficients may compute optimal weights by taking the first derivative of the SNR, set the result of this derivation to zero and solve the equation. In one example approach to solving the equation in order to identify a maximum SNR, the SNR may be defined as:

$$SNR \stackrel{\text{def}}{=} \frac{\underline{w}^H R_{ss} \underline{w}}{\underline{w}^H R_{nn} \underline{w}} \quad [1]$$

where $\underline{w}$ are the weights, and $(\cdot)^H$ is the Hermitian transpose. In equation [1], both the complex-conjugate and the transpose operation are applied. Sample covariance matrices (e.g., an approximation of the covariance matrices over a finite number of samples N) may be obtained using, for example, equation [2]:

$$R_{ss} \stackrel{\Delta}{=} \frac{1}{N} \sum_{n=1}^{N} (\underline{s}[n] \cdot \underline{s}^*[n]), R_{nn} \stackrel{\Delta}{=} \frac{1}{N} \sum_{n=1}^{N} (\underline{n}[n] \cdot \underline{n}[n]^*) \quad [2]$$

where $\underline{n}[n]$ represents complex-vector Gaussian-noise with zero-mean and variance $\sigma = N_O$ for each vector-element.

In a practical case, however, the (sample) covariance matrix Rss is generally not available. However, in accordance with some examples of the invention and for reception of an improved sensitivity AM signal the inventor of the present invention has recognised and appreciated that it is possible to use the earlier mentioned samples of the input AM signals in order to obtain an approximation of the (sample) covariance matrix Rss, as illustrated in equation [3], which yields:

$$R_{ss} \approx R_{\hat{s}\hat{s}} \stackrel{\Delta}{=} \frac{1}{N} \sum_{n=1}^{N} (\hat{s}[n] \cdot \hat{s}^*[n]) \quad [3]$$

where s[n] is the stream of vector-samples of the input AM signals. In this instance, the optimum weighting-coefficients, i.e., the weight-vector, may be obtained by maximizing the SNR, in a manner known to those skilled in the art and as shown in equation [4], see US20160142119, by W. J. van Houtum, titled 'Beam forming with double-null-steering for in-band on-channel reception'.

$$\underline{w}_{opt} \stackrel{\text{def}}{=} \arg\max_{\underline{w}}\{SNR\} = \arg\max_{\underline{w}} \left\{ \frac{\underline{w}^H R_{ss} \underline{w}}{\underline{w}^H R_{nn} \underline{w}} \right\} \quad [4]$$

To solve this maximization problem, it is possible to take the complex gradient of the SNR for each bin with respect to the complex-weights and setting the result to zero, which yields;

$$\nabla_{\underline{w}^H} \left\{ \frac{\underline{w}^H R_{ss} \underline{w}}{\underline{w}^H R_{nn} \underline{w}} \right\} = \nabla_{\underline{w}^H} \left\{ (\underline{w}^H R_{ss} \underline{w})(\underline{w}^H R_{nn} \underline{w})^{-1} \right\} = 0 \quad [5]$$

Where: $\nabla\{\cdot\}$ means take the complex gradient. By applying partial-differentiation, this gives:

$$R_{ss}\underline{w}(\underline{w}^H R_{nn}\underline{w})^{-1} - (\underline{w}^H R_{nn}\underline{w})^{-2} R_{nn}\underline{w}(\underline{w}^H R_{ss}\underline{w}) = 0 \quad [6]$$

which can be rewritten as;

$$R_{ss}\underline{w}(\underline{w}^H R_{nn}\underline{w})^{-1} = \quad [7]$$
$$(\underline{w}^H R_{nn}\underline{w})^{-2} R_{nn}\underline{w}(\underline{w}^H R_{ss}\underline{w}) \Rightarrow R_{ss}\underline{w} = R_{nn}\underline{w}\frac{\underline{w}^H R_{ss}\underline{w}}{\underline{w}^H R_{nn}\underline{w}} \stackrel{\Delta}{=} R_{nn}\underline{w}\lambda$$

using the following definition as the SNR of the desired-signal;

$$\lambda \stackrel{\text{def}}{=} \frac{s}{n} = \frac{\underline{w}^H R_{ss} \underline{w}}{\underline{w}^H R_{nn} \underline{w}} \quad [8]$$

Equation [8] may be rewritten as;

$$R_{ss}\underline{w} = R_{nn}\underline{w}\lambda \Rightarrow (R_{nn}^{-1} R_{ss})\underline{w} = \lambda\underline{w} \quad [9]$$

and equation [9] may be used to solve an Eigen-value problem. The solution of the Eigen-value problem of [9] provides the optimal weights for maximizing the SNR and is given by;

$$\underline{w}_{opt} = P\{R_{nn}^{-1} R_{ss}\} \quad [10]$$

where $P\{\cdot\}$ is the operator that returns the principal Eigenvector of a matrix via, say, a PCA method that computes the principal Eigen-vector by subtraction of the obtained Eigen-value from a column of the Spatial Covariance Matrix (SCM), for example according to the Cayley-Hamilton theorem.

Now, with a two-receiver path (e.g., from two antennas) system, the (sample) covariance matrix is a 2-by-2 matrix and the characteristic function (that provides the two Eigenvalues) to compute the (principal) Eigen-vectors is a quadratic-function that needs to be solved and is given by:

$$\lambda^2 - tr\{A\}\lambda + \det\{A\} = 0 \Rightarrow \lambda_{1,2} = \frac{tr\{A\} \pm \sqrt{tr\{A\}^2 - 4 \cdot \det\{A\}}}{2} \quad [11]$$

where $A \stackrel{\Delta}{=} R_{nn}^{-1} R_{ss}$, $tr\{A\}$ is the trace of matrix A, and $\det\{A\}$ is the determinant of matrix A.

However, the (sample) covariance matrix $R_{nn}$ of independent zero-mean complex-Gaussian noise variables is assumed to be a diagonal matrix with noise variances $\sigma^2$ on the main-diagonal. Therefore, the inverse sample covariance matrix $R_{nn}^{-1}$ is also a diagonal matrix and, based on the proportionality, it then becomes possible to drop $R_{nn}$ out of the equation:

$$R_{nn}^{-1} R_{ss} \propto R_{ss} \Rightarrow \underline{w}_{opt} = P\{R_{nn}^{-1} R_{ss}\} \propto P\{R_{ss}\} \quad [12]$$

Finally, the optimal weights for the desired signal can be written as:

$$\underline{w}_{opt} = P\{R_{ss}\} \quad [13]$$

where the Principal Eigen-vector is obtained via, say, the above described, PCA method.

Thereafter, the optimal-weights that maximize the SNR for the received-signal, obtained by the PCA method, are used to preserve the desired-signal by the above-described process. Hence, the resulting desired AM-signal is then given by:

$$\hat{s}_{SPCAM}[n]\underline{w}_{opt}{}^H(\underline{s}[n]+\underline{n}[n]) \cong (\underline{w}_{opt}{}^H\underline{s}[n])+v[n] \qquad [14]$$

where the desired signal is coherently added and the noise is non-coherently added.

Note, that the optimal-weights for a spatial phase corrector circuit for amplitude modulation (SPCAM) are updated every N-samples for a two-path (e.g. two antennas) system with $\hat{s}_{SPCAM}[n]$ the coherently-added desired-signal (e.g., output signal 250 in FIG. 2 and FIG. 3) and v[n] the complex-Gaussian noise with both zero-mean and with variances $\sigma_{\hat{s}_{SPCAM}}^2 = 4\sigma_s^2$ and $\sigma^2 = 2N_0$, respectively, i.e., optimal weights are normalized (optimal-gain 10 $\log_{10}(2)=3$ dB).

Mobile or automotive AM systems never use spatial diversity from two antennas as the AM frequencies require the antennas to be spaced too far apart, e.g., 150 m apart using typical AM frequencies. Therefore, when considering the input-signals of the above examples for a very closely-spaced two antennas system, the antenna separation distance is roughly two-and-half-thousandths of one wavelength $$\left(\text{i.e., } d \approx \frac{\lambda}{400}\right).$$

In an automotive sector application, a maximum of two antennas, i.e., two receiver paths, is used. Thus, only the two receiver paths need to betaken into account in order to compute, on a sample-basis, a (low-complexity) two-by-two SCM. Such a computation may be advantageously performed at a baseband sample speed.

Examples of the invention further provide an improvement of the received signal-power of multiple analog (continuous-wave) AM-signals, which are received with very closely spaced FM-receiver antennas. In some examples, a delay-sum beamforming (BF) technique, i.e., complex multiplication and addition, which may use a digitally-discretized complex baseband, is employed with an Eigen vector determination process to obtain weights for the coherent combining of multiple (say, two in an automotive application) very closely spaced antennas. In addition, all the phase mis-alignment (non-aligned and or non-synchronized phases) between the two paths itself will also be corrected by the SPC.

In the foregoing specification, examples of the invention have been described with reference to specific examples of embodiments of the invention. It will, however, be evident that various modifications and changes may be made therein without departing from the scope of the invention as set forth in the appended claims, and that the claims are not limited to the specific examples described above. The connections as discussed herein may be any type of connection suitable to transfer signals from or to the respective circuits, for example via intermediate components, devices or circuits. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals. Those skilled in the art will recognize that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality. Furthermore, those skilled in the art will recognize that boundaries between the above-described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as circuitry located on a single integrated circuit or within a same device. Alternatively, the circuit and/or component examples may be implemented as any number of separate integrated circuits or separate devices interconnected with each other in a suitable manner. Also, for example, the examples, or portions thereof, may be implemented as soft or code representations of physical circuitry or of logical representations convertible into physical circuitry, such as in a hardware description language of any appropriate type. Also, example embodiments of the invention are not limited to physical devices or units implemented in non-programmable hardware but can also be applied in programmable devices or units able to perform the desired spatial phase correction and coherent combining to improve sensitivity of an AM receiver unit by operating in accordance with suitable program code, such as minicomputers, personal computers, automotive and other embedded systems, etc. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A wireless receiver unit having a plurality of antennas and comprising:
   a first receiver connected to a first antenna of the plurality of antennas by a first receiver path and arranged to receive and frequency down-convert at least a first amplitude modulated, AM, signal and a second receiver connected to a second antenna of the plurality of antennas by a second receiver path and arranged to receive and frequency down-convert at least a second AM, signal that is a phase-shifted version of the first AM signal;
   a spatial phase corrector circuit connected to the first receiver and the second receiver and comprising:
      a computation circuit configured to generate a spatial-covariance matrix, SCM, of a received first frequency down-converted AM signal and a second frequency down-converted AM signal;
      a signal decomposition circuit coupled to the computation circuit and configured to generate an Eigen-value decomposition, EVD, of the SCM of the received first frequency down-converted AM signal and second frequency down-converted AM signal; and
      a processor coupled to the signal decomposition circuit and configured to analyse the EVD of the SCM of the received first frequency down-converted AM signal and second frequency down-converted AM signal and select and output a principal Eigen-vector that is representative of at least a first weight and a second weight; and
   a combiner operably coupled to the spatial phase corrector circuit and having a first input port operably coupled to the first receiver for receiving the first frequency down-converted AM signal and having a second input port coupled to the second receiver for receiving the second frequency down-converted AM signal and having a third input port coupled to the spatial phase corrector circuit and configured to receive the at least first weight and second weight;
   wherein the combiner is configured to apply the first weight to the first frequency down-converted AM signal received and apply the second weight to the second frequency down-converted AM signal received and coherently combine and output a weight-applied frequency down-converted AM signal.

2. The wireless receiver unit of claim 1, wherein the wireless receiver unit is an AM-frequency modulated, FM, wireless receiver unit and the plurality of antennas comprise two antennas separated in accordance with frequencies used to provide two-path spatial diversity for FM operation.

3. The wireless receiver unit of claim 1 wherein the spatial phase corrector circuit comprises, or is operably coupled to, at least one filter arranged to filter the received first frequency down-converted AM signal and second frequency down-converted AM signal and output a filtered representation of desired AM components of the received first frequency down-converted AM signal and second frequency down-converted AM signal.

4. The wireless receiver unit of claim 3, wherein the at least one filter comprises at least one of: a finite impulse response filter, FIR; an infinite impulse response filter, IIR.

5. The wireless receiver unit of claim 1, wherein the combiner comprises, or is operably coupled to, a beamforming, BF, circuit configured to apply the first weight to the first frequency down-converted AM signal received and apply the second weight to the second frequency down-converted AM signal received and wherein the selected principal Eigen-vector is representative of at least a first BF weight and a second BF weight.

6. The wireless receiver unit of claim 5, wherein the first weight is a first delay-sum BF weight applied by complex multiplication to the first frequency down-converted AM signal and the second weight is a second delay-sum BF weight applied by complex multiplication to the second frequency down-converted AM signal and the combiner is configured to coherently combine and output a weight-applied frequency down-converted AM signal by complex addition of the complex multiplied first frequency down-converted AM signal and second frequency down-converted AM signal.

7. The wireless receiver unit of claim 1, wherein the first receiver path and second receiver path comprise a first signal processing circuit configured to receive and process the first frequency down-converted AM signal and a second signal processing circuit configured to receive and process the second frequency down-converted AM signal, wherein the selected principal Eigen-vector is representative of at least a first weight and a second weight that are applied to at least one of: a phase adjustment circuit, a gain adjustment circuit, in the first signal processing circuit and second signal processing circuit.

8. The wireless receiver unit of claim 2 wherein the processor is configured to perform a principal component analysis of the EVD of a two-by-two matrix of the SCM of the received frequency down-converted AM signal, and output a principal Eigen-vector that is representative of at least a first weight and a second weight.

9. A spatial phase corrector circuit for a wireless receiver unit having a plurality of antennas, the spatial phase corrector circuit configured to receive at least a first amplitude modulated, AM, frequency down-converted signal from a first receiver via a first receiver path and a second AM frequency down-converted signal from a second receiver via a second receiver path, the spatial phase corrector circuit comprising:
   a computation circuit configured to generate a spatial-covariance matrix, SCM, of the received first frequency down-converted AM signal and second frequency down-converted AM signal;
   a signal decomposition circuit coupled to the computation circuit and configured to generate an Eigen-value decomposition, EVD, of the SCM of the received first frequency down-converted AM signal and second frequency down-converted AM signal; and
   a processor coupled to the signal decomposition circuit and configured to analyse the EVD of the SCM of the received first frequency down-converted AM signal and second frequency down-converted AM signal and select and output a principal Eigen-vector that is representative of at least a first weight and a second weight; and
   an output for outputting the principal Eigen-vector to a combiner for applying the first weight to the received first AM signal and the second weight to the second AM signal thereby coherently combining the received AM-signals.

10. The spatial phase corrector circuit of claim 9 wherein the spatial phase corrector circuit comprises at least one filter arranged to filter the received first frequency downconverted AM signal and second frequency down-converted AM signal and output a filtered representation of desired AM components of the received first frequency downconverted AM signal and second frequency down-converted AM signal.

11. The spatial phase corrector circuit of claim 10, wherein the at least one filter comprises at least one of: a finite impulse response filter, FIR; an infinite impulse response filter, IIR.

12. A method of spatial phase correction for a wireless receiver unit having a plurality of antennas, the method comprising:
receiving at least a first frequency down-converted amplitude modulated, AM, signal from a first receiver via a first receiver path and a second frequency down-converted AM signal from a second receiver via a second receiver path that is a phase-shifted version of the first frequency down-converted AM signal;
generating a spatial-covariance matrix, SCM, of the received first AM signal and second AM signal;
generating an Eigen-value decomposition, EVD, of the SCM of the received first frequency down-converted AM signal and second frequency down-converted AM signal; and
analysing the EVD of the SCM of the received first frequency down-converted AM signal and second frequency down-converted AM signal and selecting a principal Eigen-vector that is representative of at least a first weight and a second weight; and
applying the first weight to the first frequency down-converted AM signal and applying the second weight to the second frequency down-converted AM signal; and
coherently combining and outputting a weight-applied frequency down-converted AM signal.

13. The method of claim 12 further comprising filtering the received first frequency down-converted AM signal and second frequency down-converted AM signal and outputting to a computation circuit configured to generate a spatial-covariance matrix, SCM, of the received first frequency down-converted AM signal and second frequency down-converted AM signal a filtered representation of desired AM components of the received first frequency down-converted AM signal and second frequency down-converted AM signal.

14. The method of claim 12 wherein the selected principal Eigen-vector is representative of at least a first delay-sum beamforming, BF, weight and a second delay-sum BF weight and coherently combining the received first and second frequency down-converted AM signals comprises applying a first BF weight to the first frequency down-converted AM signal and applying the second BF weight to the second frequency down-converted AM signal and coherently combining the received weight-applied first frequency down-converted AM signal and weight-applied second frequency down-converted AM signal.

15. The method of claim 12 wherein the selected principal Eigen-vector is representative of at least a first weight and a second weight and applying the first weight to the first frequency down-converted AM signal and applying the second weight to the second frequency down-converted AM signal comprises applying a phase adjustment and/or gain adjustment circuit to the respective first frequency down-converted AM signal and second frequency down-converted AM signal to align their respective amplitude and phases for coherent combining.

16. The wireless receiver unit of claim 2 wherein the spatial phase corrector circuit comprises, or is operably coupled to, at least one filter arranged to filter the received first frequency down-converted AM signal and second frequency down-converted AM signal and output a filtered representation of desired AM components of the received first frequency down-converted AM signal and second frequency down-converted AM signal.

17. The wireless receiver unit of preceding claim 2, wherein the first receiver path and second receiver path comprise a first signal processing circuit configured to receive and process the first frequency down-converted AM signal and a second signal processing circuit configured to receive and process the second frequency down-converted AM signal, wherein the selected principal Eigen-vector is representative of at least a first weight and a second weight that are applied to at least one of: a phase adjustment circuit, a gain adjustment circuit, in the first signal processing circuit and second signal processing circuit.

18. The wireless receiver unit of claim 3 wherein the processor is configured to perform a principal component analysis of the EVD of a two-by-two matrix of the SCM of the received frequency down-converted AM signal, and output a principal Eigen-vector that is representative of at least a first weight and a second weight.

19. The method of claim 13 wherein the selected principal Eigen-vector is representative of at least a first delay-sum beamforming, BF, weight and a second delay-sum BF weight and coherently combining the received first and second frequency down-converted AM signals comprises applying a first BF weight to the first frequency down-converted AM signal and applying the second BF weight to the second frequency down-converted AM signal and coherently combining the received weight-applied first frequency down-converted AM signal and weight-applied second frequency down-converted AM signal.

20. The method of claim 13 wherein the selected principal Eigen-vector is representative of at least a first weight and a second weight and applying the first weight to the first frequency down-converted AM signal and applying the second weight to the second frequency down-converted AM signal comprises applying a phase adjustment and/or gain adjustment circuit to the respective first frequency down-converted AM signal and second frequency down-converted AM signal to align their respective amplitude and phases for coherent combining.

* * * * *